W. L. FEE.
DISK CLUTCH TRANSMISSION.
APPLICATION FILED JAN. 22, 1914.
1,154,749.
Patented Sept. 28, 1915.
2 SHEETS—SHEET 1.
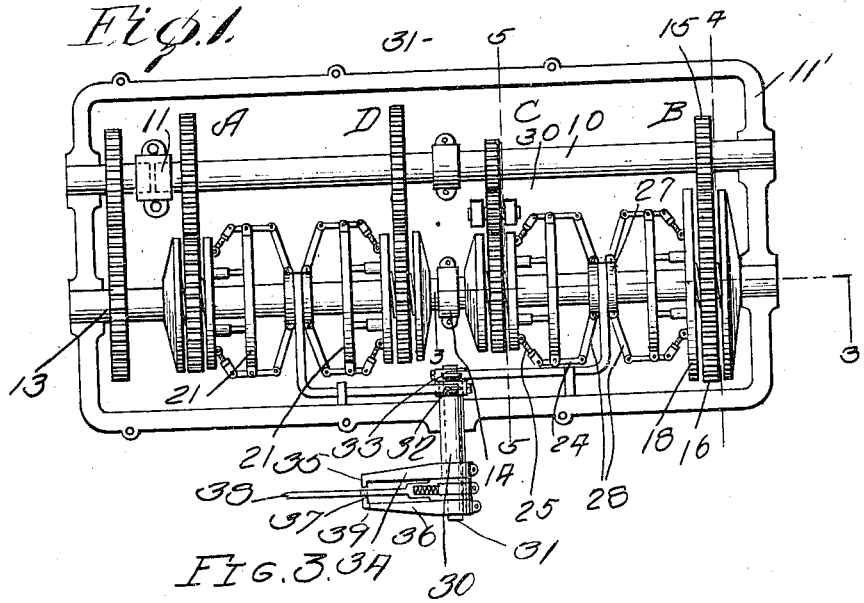
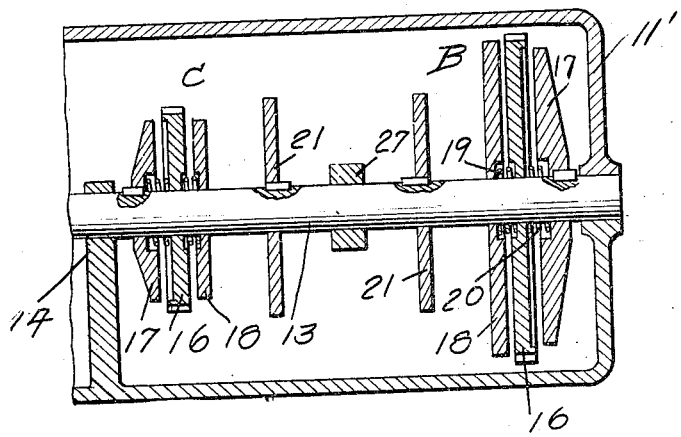
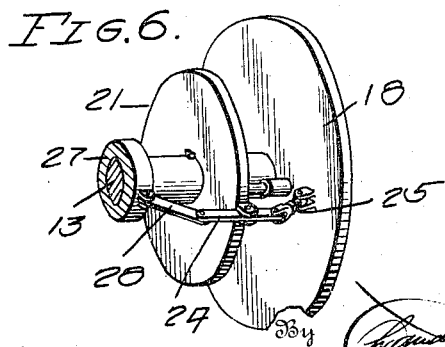
Inventor
W. L. Fee
Witnesses W. L. FEE.
DISK CLUTCH TRANSMISSION.
APPLICATION FILED JAN. 22, 1914.
1,154,749.
Patented Sept. 28, 1915.
2 SHEETS—SHEET 2.
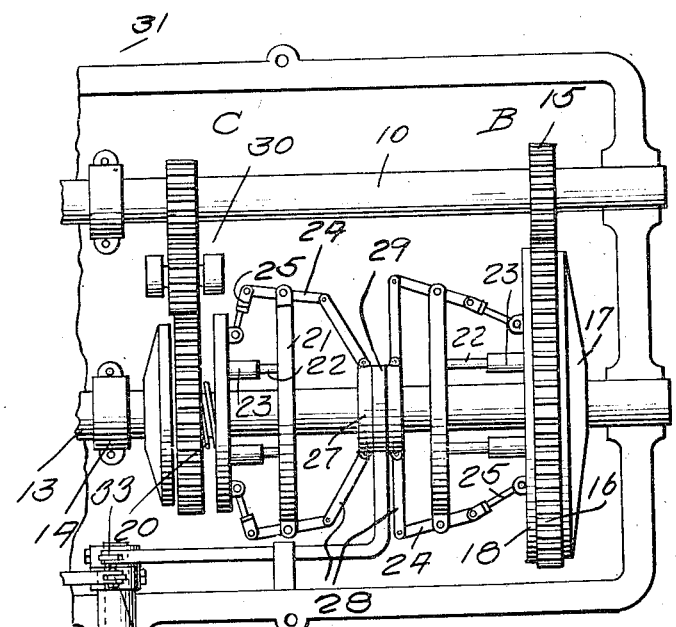
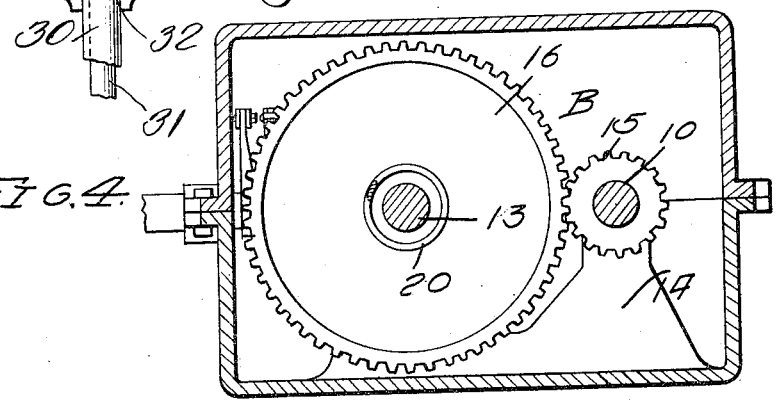
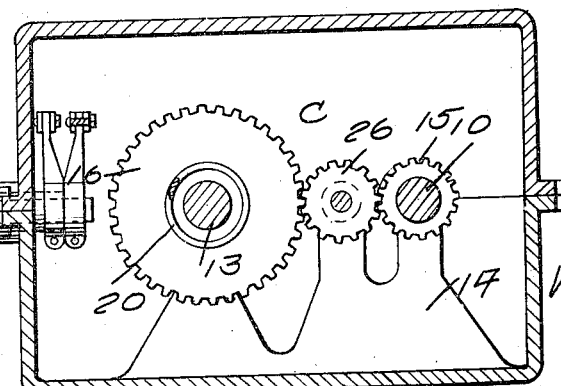
Witnesses
Inventor
W. L. Fee
By  Attorneys

UNITED STATES PATENT OFFICE.

WALTER L. FEE, OF MOLINE, ILLINOIS.

DISK-CLUTCH TRANSMISSION.

1,154,749.  Specification of Letters Patent.  Patented Sept. 28, 1915.

Application filed January 22, 1914. Serial No. 813,794.

*To all whom it may concern:*

Be it known that I, WALTER L. FEE, a citizen of the United States, residing at Moline, in the county of Rock Island, State of Illinois, have invented certain new and useful Improvements in Disk-Clutch Transmissions; and I do hereby declare the following to be a full, clear, and exact description of the invention, such as will enable others skilled in the art to which it appertains to make and use the same.

This invention relates to clutch devices for transmissions.

The object of the invention is to provide a device of the character named which will be simple in construction, efficient in use and comparatively inexpensive to manufacture and maintain.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a plan view of my improved transmission. Fig. 2 is an enlarged plan view showing a portion of the transmission with one of the clutches in operative position. Fig. 3 is a longitudinal sectional view on the line 3—3 of Fig. 1. Fig. 4 is a cross sectional view on the line 4—4 Fig. 1. Fig. 5 is a cross sectional view on the line 5—5 Fig. 1, Fig. 6 is a fragmentary detail view showing the link motion for operating one of the clutches.

Referring now to the drawing in which like characters of reference designate similar parts, 10 designates a shaft which is mounted in a bearing 11 and one end of a casing 11' and is driven in any preferred manner from the engine. Extending parallel with the shaft 10 is a shaft 13 that is driven from the shaft 10 as will be presently described and is mounted in a bearing 14 and in the ends of the casing 11' as shown, this driven shaft being operatively connected to the drive wheels of the machine in the usual manner.

The driving shaft 10 and driven shaft 13 are operatively connected together at various points through the instrumentality of novel clutch gear connections, A indicating the high speed gear connection, B the low speed connection, C the reverse gear connection, and D the intermediate speed gear connection, any particular gear connection being thrown into active position to transmit the motion of the driving shaft to the driven shaft at a desired speed and in a desired direction as usual.

For brevity and clearness, but one of the clutch gear connections will be described in detail, since the remaining clutch gear connections are counterpart of the one described. Each clutch gear connection comprises a gear 15 keyed on the driving shaft 10, a gear 16 loose on the driven shaft 13, there being a clutch disk 17 keyed on the driven shaft and on one side of the loose gear and there being a clutch disk 18 slidably fitted on the driven shaft on the opposite side of the loose gear. Helical springs 19 and 20 are seated on the driven shaft between the loose gear and the clutch disks to prevent accidental engagement of the disks with the gear.

A disk 21 is keyed on the driven shaft and is provided on one face with guide pins 22 upon which telescope tubes 23 carried by the clutch disk 18. Levers 24 are pivoted on the periphery of the disk 21 and links 25 are pivoted to these levers and to the disk 18. Upon the link levers being rocked outwardly the angle between the levers and the related links will be straightened whereby the links serve to move the disk 18 up against the loose gear 16 with a resultant binding of the latter against the disk 17 whereby the loose gear is locked for rotation with and drives the driven shaft. By virtue of the loose gear being always in mesh with the gear 15 the clutch will become active the instant the clutch disk 18 binds the loose gear against the clutch disk 17 so that a positive and quick acting clutch and at the same time a noiseless clutch is produced.

The free front speeds A, B and D are identical, and the above description suffices for all, but the reverse speed includes the provision of an intermediate gear 26 between the driving gear 15 and driven gear 16 whereby the direction of rotation of the shaft 10 is transmitted reversed to the shaft 13 as will be understood.

For shifting the clutch gear transmissions selectively into active or released position, I provide a block 27 that is slidably mounted on the driven shaft between adjacent clutch gear transmissions as shown and is provided with peripheral pivotal links 28 which are connected to the related levers 24, and the block is provided with a shifting yoke lever 29.

Journaled in the casing 11' is a sleeve 30 and rotatable in the sleeve 30 is a shaft 31. Mounted on the end of the sleeve 30 disposed within the casing 11' is an arm 32, while another arm 33 is mounted on the end of the shaft 31 which is disposed in said casing. These arms 32 and 33 are connected respectively to the yoke levers 29. Mounted on the outer end of the sleeve 30 is an arm 34 the free end of which is provided with a lateral extension 35. Mounted on the outer end of the shaft 31 is an arm 36 provided at its free end with a lateral extension 37 directed toward the extension 35. Pivoted between the arms 34 and 36 upon the sleeve 30 is a lever 38 adapted to be flexed to either side. This lever 38 is provided with a passage 39 adapted to receive the extensions 35 and 37 according to the direction in which the lever is flexed. By engaging these extensions 35 and 37 selectively in the passage 39 it will be obvious that the lever 38 can be operated to throw any of the transmissions into active position.

From the above description it will be seen that I have provided an extremely simple and effective clutch gear transmission that will be quick acting and noiseless and will be formed of a few strong and simple parts that will not easily get out of order.

What is claimed, is:—

In a clutch mechanism the combination of a shaft, a member to be clutched rotatable and slidable on the shaft, a friction disk fixed on the shaft; on one side of the member, a second friction disk slidable on the shaft on the other side of the member, spring means interposed between the member and each disk for normally holding said disks out of operative relation to the member, and means for moving the splined disk against the member to in turn force the latter against the fixed disk and whereby the member is locked to both of said disks, said means comprising socketed projections on the outer side of the second named friction disk, a member slidable on said shaft and having projections thereon slidable in respective sockets of the projections, levers pivoted on said member at diametrically opposite points, links connecting corresponding ends of said levers with the second named friction disk, and means for rocking said levers to slide the friction disk on the shaft.

In testimony whereof, I affix my signature, in the presence of two witnesses.

WALTER L. FEE.

Witnesses:
 CHESTER KENNEDY,
 EMIL BELOWSKE.